Patented Nov. 2, 1926.

1,604,948

UNITED STATES PATENT OFFICE.

ALEXANDRE AIZER, OF NEW YORK, N. Y.

PLASTIC COATING COMPOSITION.

No Drawing.  Application filed March 15, 1926. Serial No. 94,951.

The object of my invention is to produce a novel and comparatively inexpensive plastic coating composition which can be readily applied to a surface with a brush, which will not deteriorate or loose its effectiveness when left standing for a considerable time and which can be made under ordinary temperatures.

The ingredients that I use to make up the composition are:—white lead, raw linseed oil, Japan drier, turpentine, whiting, plaster of Paris, cement, varnish and sand mixed at ordinary temperatures. I may also add any suitable coloring matter to the mixture as the composition is being made up, or I may apply the coloring matter to the coating after it has been applied to the desired surface. I may also add a little water to the mixture if desired.

The proportions of the several ingredients which I have found to produce the best results are as follows: white lead from 2 to 2½ pounds; oil from 4 to 5 ounces (liquid mixture); Japan drier 4 ounces (liquid mixture); turpentine 13 ounces (liquid mixture); whiting 1½ to 2½ pounds; plaster of Paris 1 to 2 pounds; cement ¾ to 1 pound; varnish 1 to 2 ounces (liquid mixture); sand 1 to 2 pounds.

If water is to be added, the proportion would be about one ounce. If coloring matter is to be added, it would be in any desired proportion to secure the required coloring effect.

In producing the compound, the different ingredients are placed in a suitable receptacle, preferably in the order named above, the mass at the same time being stirred to thoroughly mix the ingredients. The resultant composition will be of heavy consistency but not too heavy to be applied with a brush. After the compound has been applied and before it is dry, its surface may be smoothed to produce the well known travertin effect and also numerous Italian plaster effects.

From the above description it will be seen that my improved plastic coating composition comprises generally white lead, whiting, plaster of Paris and cement, combined with a suitable vehicle containing an oil and a varnish, although preferably it is better to add turpentine and Japan drier as separate elements.

What I claim is:—

1. A coating composition comprising white lead, whiting, plaster of Paris, cement and sand, and a vehicle combined in such proportions as will produce a composition of relatively heavy consistency but adapted to be applied with a brush.

2. A coating composition, comprising white lead, whiting, plaster of Paris, cement, sand, and a vehicle containing an oil and a varnish combined in such proportions as to produce a composition of heavy consistency but adapted to be applied with a brush.

3. A coating composition of heavy consistency comprising substantially two to two and one-half pounds of white lead; four to five ounces of oil; four ounces Japan drier; thirteen ounces turpentine; one and one-half to two and one-half pounds whiting; one to two pounds plaster of Paris; three-fourths to one pound of cement; one to two ounces of varnish; and one to two pounds of sand.

In testimony that I claim the foregoing as my invention, I have signed my name this 12th day of March, 1926.

ALEXANDRE AIZER.